E. BERGMANN.
WATER PURIFIER.
APPLICATION FILED DEC. 26, 1911.
1,038,480.
Patented Sept. 10, 1912.
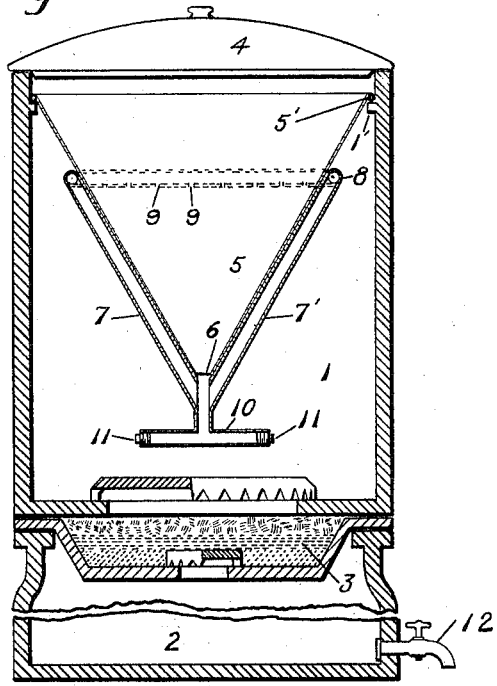
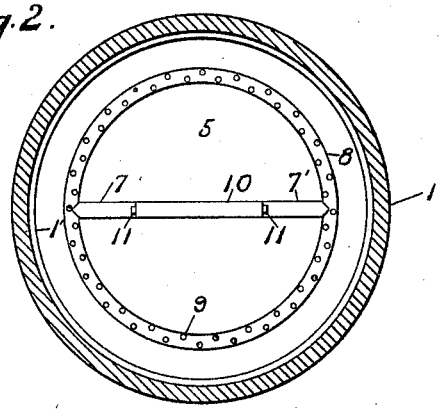
WITNESSES
INVENTOR

UNITED STATES PATENT OFFICE.

EMIL BERGMANN, OF LOS ANGELES, CALIFORNIA, ASSIGNOR TO AUGUST J. GULCK, OF LOS ANGELES, CALIFORNIA.

WATER-PURIFIER.

1,038,480.  Specification of Letters Patent.  Patented Sept. 10, 1912.

Application filed December 26, 1911. Serial No. 667,826.

*To all whom it may concern:*

Be it known that I, EMIL BERGMANN, a citizen of the United States, residing at Los Angeles, in the county of Los Angeles and State of California, have invented a new and useful Water-Purifier, of which the following is a specification.

My invention refers to devices for purifying drinking water, and the object of my invention is to provide a simple and effective means by which the water to be purified may be atomized and aerated and the sediment therein eliminated before it passes through the filter bed. I attain these objects by means of the mechanism illustrated in the accompanying drawings, in which—

Figure 1 is a sectional view of the elevation of a filter containing my device. Fig. 2 is a cross sectional view of a filter looking from the bottom of the water receptacle.

In Fig. 1, 1 is the water receptacle of the filter, 1' a shoulder, 2 the purified water chamber, 3 the filter bed, 4 the cover, 5 the water funnel, 5' a bead on the funnel, 6 the outlet pipe from the funnel, 7 and 7' the conduit from the outlet pipe to the atomizing ring, 8 the atomizing ring, 9 the perforations in the ring, 10 the settling tube, 11 the plugs in the settling tube, 12 the outlet tap for pure water.

In Fig. 2 the same reference numerals indicate the same parts.

The funnel 5 is open at the top and is made with the bead 5' at the top edge and which is made to fit the inside of the water receptacle 1 and rest on the shoulder 1'. From the small end of the funnel 5 depends a short vertical tube 6 ending in a cross tube 10 having removable plugs 11 in its ends. From the tube 6, close to the funnel 5, the two tubes 7 and 7' branch upward and connect with the ring 8. This ring is pierced with the perforations 9.

When this apparatus is placed in the water receptacle of a water purifier, the water to be purified is poured into the funnel 5 and runs down the tube 6 and up the tube 7 and 7' into the ring 8; from whence it descends from the perforations, in a fine shower, into the water receptacle 1, being thus aerated by fine division. All sediment in the water will settle in the tube 10 from whence it may be removed by removing the plugs 11. From the water receptacle 1 the water will percolate through the filter bed 3 into the pure water chamber 2, from whence it may be drawn off at the faucet 12.

The ring 8 may have any number of perforations, and these perforations be of any size necessary to produce a fine shower. They are preferably placed at the bottom of the ring, but may be placed otherwise if necessary to produce a fine subdivision of the water. The ring 8 may be placed at any height which will place it above the surface of the water in the receptacle 1. The filter bed may be made of any suitable material.

What I claim as my invention and desire Letters Patent for is—

In a water purifier, in combination with a water receptacle, a funnel, a tube leading downward from said funnel, a T on said tube, plugs in said T, branch tubes leading upward from said tube, a ring on said branch tubes and connected therewith, and perforations in said ring.

EMIL BERGMANN.

Witnesses:
J. E. BOOKSTAVER,
R. P. ELLIOT.

Copies of this patent may be obtained for five cents each, by addressing the "Commissioner of Patents, Washington, D. C."